United States Patent
Kemmler et al.

(10) Patent No.: US 6,744,514 B2
(45) Date of Patent: Jun. 1, 2004

(54) PROCESS AND ARRANGEMENT FOR DETECTING OR RECOGNIZING AN OBJECT

(75) Inventors: Manfred Kemmler, Vörstetten (DE); Thomas Meinert, Emmendingen (DE); Dirk Trüper, Schoenbourg (FR)

(73) Assignee: SensoPart Industriesensorik GmbH, Wieden (DE)

( * ) Notice: Subject to any disclaimer, the term of this patent is extended or adjusted under 35 U.S.C. 154(b) by 456 days.

(21) Appl. No.: 09/824,577

(22) Filed: Apr. 3, 2001

(65) Prior Publication Data

US 2002/0018208 A1 Feb. 14, 2002

(30) Foreign Application Priority Data

Apr. 3, 2000 (DE) ......................... 100 16 349

(51) Int. Cl.$^7$ .................................. G01J 3/46
(52) U.S. Cl. ............... 356/425; 356/406; 250/226
(58) Field of Search .................. 356/402, 406, 356/407, 425, 405, 419; 250/226

(56) References Cited

U.S. PATENT DOCUMENTS

| | | | | |
|---|---|---|---|---|
| 2,358,020 A | * | 9/1944 | Miller | 356/425 |
| 3,992,110 A | * | 11/1976 | Frazer et al. | 356/419 |
| 4,004,660 A | * | 1/1977 | Shore et al. | 188/271 |
| 4,175,231 A | | 11/1979 | Murata | |
| 4,533,243 A | * | 8/1985 | Zhukov et al. | 356/44 |
| 5,748,221 A | * | 5/1998 | Castelli et al. | 347/232 |
| 5,854,680 A | * | 12/1998 | Rakitsch | 356/406 |

FOREIGN PATENT DOCUMENTS

| | | |
|---|---|---|
| DE | 2205996 | 8/1973 |
| DE | 1930111 | 7/1974 |
| DE | 2423056 | 12/1975 |
| DE | 3416275 | 5/1992 |
| EP | 0735501 | 3/1996 |

* cited by examiner

Primary Examiner—Euncha Cherry
(74) Attorney, Agent, or Firm—Dennison, Schultz & Dougherty

(57) ABSTRACT

The invention relates to a process and a device for detecting or recognizing an object by means of color recognition or brightness evaluation, whereby radiation emitted by a radiation source on the object and radiation reflected from the object is recorded by a photosensitive element such as a color-recognizing sensor. In order to be able to detect objects with a higher measuring exactitude, whereby changes in distance between object and light-sensitive element should not basically lead to a measurement falsification, it is suggested that reflected radiation be guided to the photosensitive element by means of a light-guiding element tapering in the direction of the photosensitive element.

16 Claims, 1 Drawing Sheet

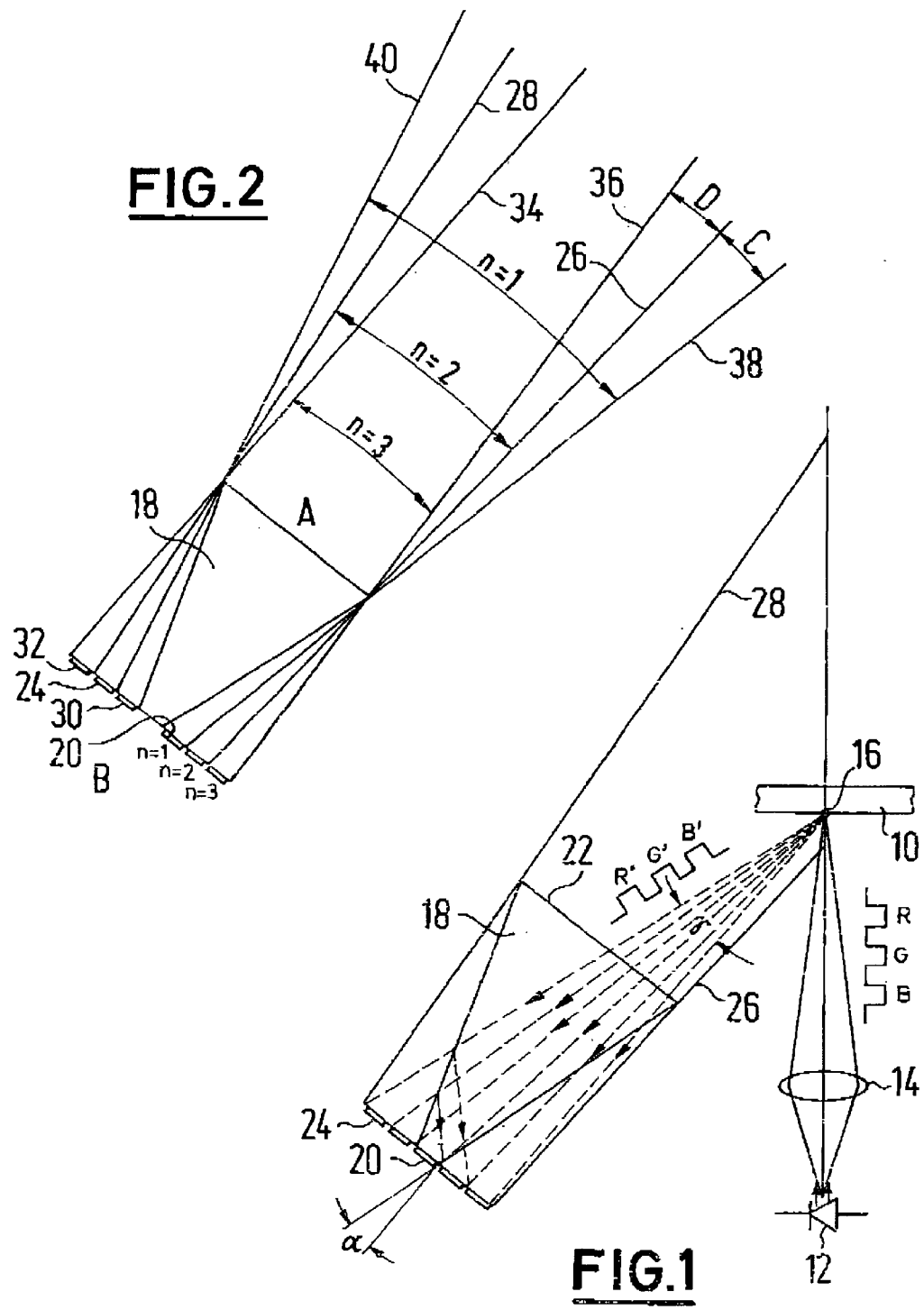

PROCESS AND ARRANGEMENT FOR DETECTING OR RECOGNIZING AN OBJECT

BACKGROUND OF THE INVENTION

The invention relates to a process for detecting or recognizing an object by the comparison of the detected color of the object with a specified standard color whereby radiation emitted on the object from a radiation source and radiation reflected from the object are recorded by a color-recognizing sensor. Furthermore, the invention relates to an arrangement for detecting or recognizing an object by means of color recognition including a radiation source emitting radiation on the object such as LED, as well as at least one color-recognizing sensor recording radiation emitted by the object.

In order to recognize or position or record its orientation and/or position, color-recognizing sensors or color identification sensors, which are usable like conventional position sensors, can be used. Here the colors of the objects are compared with specified standard colors so that, for example, when the detected color agrees with the standard color within a tolerance range, a signal is set. But corresponding sensors also can get into use for quality assurance of products.

In order to record the color or colors by sensor, a white light source can be used as a radiation source. Radiation reflected by the object to be recorded can then be subdivided into its spectral components, red, green and blue, through mirrors and color filters in order to be able to determine the color itself on the basis of the color composition of the respective component light streams emerging from this. The use of white light moreover has the advantage that all colors can be recognized even if, for example, high heat loss arises with the use of a halogen lamp as a white light source. Furthermore, optical processing of the reflected light is disadvantageous.

Irradiating objects by means of semiconductor illumination is also known. For this, the radiations of a red, green and blue LED are concentrated over wave length-dependent reflecting mirrors and lenses into a light ray so that, under ideal conditions, an almost white light point arises. The object reflects as a function of the surface a corresponding component of each color so that once again the receiver transforms the spectral light component into an appropriate signal.

The LED's can also be sequentially actuated so that the receiver transforms the color-dependent reflection into a corresponding signal.

Independently of the type of light source and the structure of the receiver, the reflected light is imaged through an imaging optical system on the sensor. In this way, the optical system can be constructed as a two pupils system with a transmitting pupil and a separate receiving pupil or as an auto-collimation principle, where transmitting and receiving pupil are identical. If several LED's are used as a radiation source, the receiver is sensitive over a wide band of colors, whereby in contrast when a white LED is used, the receiver is selectively sensitive for the three color components.

The known arrangements are disadvantageous when the distance between the object to the sensor changes. Thus the light spot on the sensor moves in the two pupils system so that in particular with a small distance between object and sensor, the light spot can leave the light sensitive surface. This once again means that a strong change in the spectral components received and consequently of the sensed receiving energy exists with the consequence that considerable measuring errors arise.

Owing to the auto-collimation system, the effect of a lateral movement of the imaged light spot on the light sensitive surface is indeed prevented even if the measured signal can be falsified by changing the image size on the sensor, especially at short distances.

U.S. Pat. No. 4,175,231 relates to an arrangement to determine whether, in a rotary printing press, in a copier or in a rotary drum camera, an object, such as an original, is moving into a position in which copying of the former can take place. For this purpose, a light-sensitive sensor is arranged at a fixed distance to the moving object on which light reflected from the object is detectable. An optical wave guide is arranged before the sensor which has a semicircular or wedge shape.

A photoelectric digit emitter can be gathered from DE 34 16 275 C2.

For screening physical measured values, light is fed to a detector through an optical wave guide according to DE 24 23 056 A1. A fiber optical light wave guide arrangement according to DE-OS 2 205 996 is comprised of a large number of individual fibers.

In order to measure elements moving in relation to one another, line-like linearly arranged optical wave guide fibers are used, according to DE-AS 1 930 111, over which light is emitted on the moving elements as well as redirected to a photo detector.

With the color sensing arrangement relating a representative a representative arrangement for reading colored markings according to EP 0 735 501 A2, the radiation reflected from an object is imaged through a ray splitter and an optical system comprising a lens on a photo element.

Underlying the present invention is the problem of perfecting a process and arrangement of the type mentioned at the beginning such that objects can be detected with high measurement accuracy, whereby changes in distance between object and color-recognizing sensor should basically not lead to a falsification of measurements. The spectral light components should also be recordable with requisite intensity. Furthermore, color falsifications should be ruled out.

SUMMARY OF THE INVENTION

In accordance with the invention, the problem is solved through a process in which reflected radiation is guided to the color-recognizing sensor by means of a light guiding element tapering in the direction of the color-recognizing sensor with the shape of a truncated pyramid, whereby the light-guiding element is constructed for the reflected radiation such that the radiation incident upon the light-guiding element is reflected maximally n times where $n \leq 2$.

Through the theory of the invention, the receiving pupil can be greatly enlarged without an imaging taking place through optical lenses. This once again means that a change of image site and image size as a function of the distance between object and color-recognizing sensor does not take place. In other words, the radiation is concentrated on the color-recognizing sensor without imaging errors otherwise engendered by lenses, thus almost optically imaging-free or imaging error-free.

Since furthermore the reflected light is preferably reflected twice within the optical conductor, no shading effect can occur in a large distance range owing to the spatially separated arrangement of radiation source such as LED and optical wave guide. Through the theory of the invention, a significantly improved depth of field results.

It is moreover especially provided that the reflected radiation is guided over the light-guiding element on $(2 \times n+1)^2-1$ virtual color-recognizing sensors as well as on the one real color-recognizing sensor, whereby n is the number of reflections of the reflected radiation in the light-guiding element.

An arrangement for detecting or recognizing an object by means of color recognition of the type mentioned at the beginning is distinguished in that between the object and at least one color-recognizing sensor is allocated a truncated pyramid shaped light-guiding element tapering in the direction of the color-recognizing sensor of light-permeable solid material and in that the light-guiding element for the reflected radiation is dimensioned such that radiation reflected from the object and falling into the light-guiding element is reflectable to the greatest extent n times with n=2.

A white light-emitting LED is preferably used as a radiation source. The radiation can also be a white-light emitting laser. The color-recognizing sensor itself has a red, blue and green-sensitive surface.

It is furthermore provided that the sensor-side efflux surface of the optical wave guide is equal to the radiation-sensitive overall surface of the actually measuring, thus real sensor.

Independently of this, an air-free slot should exist between sensor-side truncated pyramid base surface and sensor which is, for example, filled with an optical glue, silicon or the like, especially with a material the refraction index of which corresponds to that of the truncated pyramid, or is at least similar to it.

With maximally twofold reflection, especially total reflection, from reflected radiations incident upon the optical wave guide, the optical wave guide with lens side influx surface should have an area extension that corresponds to at least 25 times, preferably more than 25 times the radiation-sensitive overall area of the color-recognizing sensor.

It is especially provided that at least one color-recognizing sensor on which radiation from the object and penetrating the light-guiding element, perceives a radiation energy which corresponds to radiation reflected from the object from the one color-recognizing sensor corresponding to the $(2 \times n+1)^2-1$ virtual color-recognizing sensor plus the one (real) color-recognizing sensor received directly from the object, whereby n is the maximum number of reflection[s] of radiation in the light-guiding element.

Furthermore, the radiation reflected from the object into the light-guiding element penetrates an apparent aperture diaphragm which is specified by acceptance cones fixed between the site of reflection on the object and the overall peripheral edge of the virtual color-recognizing sensors.

Finally, the radiation is supposed to arise on the object in a usable receiving area which is delimited by an envelope which is fixed by the overall peripheral edge of the virtual color-recognizing sensor as well as the peripheral edge of the influx area of the light-guiding element.

Through the theory of the invention, there results an economical arrangement for exact recognition and position of objects by means of a color-recognizing sensor or color identification sensor. A refracting optical system such as lenses for the reflected radiation is avoided so that the disadvantages existing in the state of the art in relation to the wandering of light spot on the light-sensitive sensor or the various imaging size of the light spot as a function of the distance between object and sensor is ruled out. The receiving area for objects to be detected is relatively large whereby a falsification of the measured results through changing the distance is precluded.

The invention is explained below on the basis of a preferred embodiment to be gathered on the basis of the drawings, wherein:

BRIEF DESCRIPTION OF THE DRAWINGS

FIG. 1 Shows a basic representation of an arrangement for recognizing of objects and FIG. 2 Reveals the area of detection coverable with the arrangement according to FIG. 1.

DETAILED DESCRIPTION OF THE INVENTION

In FIG. 1, an arrangement for recognizing and positioning objects by means of a color-recognizing sensor is represented diagrammatically.

In order to be able to recognize or detect an object 10, which means be able to compare its color with a specified standard color, in order to trigger an appropriate signal in the event of agreement within a tolerance range or in the event of an impermissible deviation, which make possible statements on the quality of the object, its position or orientation (for example, front or reverse side), or its contour, in this embodiment, radiation is emitted point-wise from a light source constructed as an LED 12. For this purpose, the radiation issuing from the preferably white light-emitting LED 12 through a liens 14 is imaged on a point 16 of the object 10. The radiation is reflected from the object 10, that is from point 16, and reaches a color-recognizing sensor 20 through an optical wave guide 18 having the shape of a truncated pyramid and made of transparent solid material such as Plexiglas or glass which has three color-sensitive surfaces, that is red, blue and green-sensitive surfaces. The space between efflux area and color-sensitive surfaces is filled with a medium (for example, silicon) adapted to the refraction index.

The radiation emitted from the transmitter 12 is reflected from the object 10, whereby red (R), green (G) and blue (B) components of the radiation change as a function of the object 10 or its surface structure into reflected components R', G' and B'. The detected color components R', G', B' are then compared with standard specifications.

The optical wave guide 18 tapers in the direction of the sensor 20, whereby the efflux surface of the optical wave guide 18 is equal to the light-sensitive overall area of the sensor.

Moreover the optical wave guide 18 in particular has a square influx surface and a square efflux surface.

The shape of the optical wave guide 18 in the form of a truncated pyramid is selected such that radiation falling into the funnel 18 is reflected twice. For this purpose, the outer casing describes an angle α of ca. 6° toward the long axis of the optical wave guide.

The influx surface 22 has for its part a surface which corresponds to at least 25 times the light-sensitive area of the sensor 20 to the extent that the optical wave guide 18 is applied geometrically such that the radiation reflected from the object is reflected maximally twice into the optical wave guide 18.

Through the arrangement of the invention, light falling into the optical wave guide and reflected from the object is guided to $(2 \times n+1)^2-1$ virtual sensors 24 and the one real sensor 20 as a function of the shape and the material of the optical wave guide 18, whereby the overall radiation strikes upon the real sensor 20 conditioned by the truncated pyramid shape of the optical wave guide 18. n means here the number of maximum reflections of the radiation reflected from the object 10 and failing into the optical wave guide 18.

Since an overall receiving energy is perceived by the sensor 20 which with radiation reflected directly from the object without this passing through the optical wave guide 18 corresponds to the radiation striking upon the virtual sensors 24 and the one real sensor 20, a high receiving energy is perceivable through which a high measuring exactitude is attainable.

A real influx pupil is not required for the reflected radiation. Rather, an apparent influx pupil is formed by an aperture cone γ, which runs between the striking point 16 of the radiation reaching the object 10 from the light source 12 and the peripheral edge of the virtual sensors 24. In other words, the aperture diaphragm γ is formed by a cone fixed between a striking point 16 and the peripheral edge of the virtual sensors.

The usable measuring range which is coverable without a shading taking place through the spatially separated arrangement of the transmitting pupil, that is, the lens 14 and the optical wave guide 18, with the arrangement of the invention is clarified on the basis of FIG. 2. In this, the optical wave guide 18 is basically drawn in and its light influx area is designated with A. On the sensor side, the real sensor 20 actually measuring the radiation as well as the virtual sensors are characterized with the reference numbers 24, 30 and 32. The receiving area is henceforth determined by an envelop which is fixed from the influx area A of the optical wave guide 18 as well as the peripheral edge of the overall area of the virtual sensors 24, 30, 32. The area so fixed as well as the influx area A of the optical wave guide fixed the envelope corresponding to the usable receiving area which is indicated in FIG. 2 with delimitation lines 34, 36.

With a design of the optical wave guide 18 on two reflections (n=2), 24 virtual sensors result so that a smaller overall area results so that the fixed envelope has a larger opening angle with the same influx area 18 into the optical wave guide 18 which is restricted by rays 26, 28, which are also drawn in FIG. 1.

If the number of reflections comes to n=1, then there results on the basis of the smaller overall area of the virtual sensors 30 an even larger aperture angle which is bounded by rays 38, 40.

A shading between transmitting pupil and optical wave guide 18 would result in the embodiment represented according to FIG. 2 for an object that is acted upon by radiation in area C when thee optical wave guide is designed for n=2 reflections. This means that the external virtual sensors 32 are apparently not acted upon with reflected radiation with the consequence that correspondingly the radiation received by the real sensor 20 is diminished.

On the basis of FIG. 2 it becomes clear that objects can be detected or recorded in a large receiving area whereby owing to lacking optically refractive imagings a high depth of field exists.

Owing to the shape of the truncated pyramid the danger of a falsification of the color of the reflected light is ruled out.

What is claimed is:

1. Process for detecting or recognizing an object by comparison of detected color of the object with a specified standard color, whereby radiation is emitted by a radiation source on the object and radiation reflected from the object are recorded by a color-recognizing sensor, characterized in that the reflected radiation is guided to the color recognizing sensor by means of a truncated pyramid shaped light-guiding element tapering in the direction of the color-recognizing sensor, whereby the light-guiding element is developed for the reflected light such that the radiation falling into the light-guiding element is reflected a maximum of n times with $n \leq 2$.

2. Process according to claim 1, characterized in that
the reflected radiation is guided lens-free to the color recognizing sensor.

3. Process according to claim 1, characterized in that
the reflected radiation is guided through the light-guiding element to $(2 \times n+1)^2 - 1$ virtual color-recognizing sensors as well as to the one real color recognizing-sensor whereby n is the number of reflections of the reflected radiation in the light-guiding element.

4. Arrangement for detecting or recognizing an object (10) by comparison of the detected color of the object with a specified standard color, including a radiation source (12) such as an LED emitting radiation on the object as well as a color-recognizing sensor (20) recording radiation reflected from the object, characterized in that between the object (10) and the at least one color-recognizing sensor (20), a truncated pyramid shaped light-guiding element tapering in the direction of the color-recognizing sensor of light-permeable solid material is arranged, and in that the light-guiding element (18) is dimensioned for the reflected radiation such that radiation reflected from the object (10) and falling into the light-guiding element is reflectable maximally n times with n=2.

5. Arrangement according to claim 4, characterized in that
the light-guiding element (18) is made of Plexiglas or glass.

6. Arrangement according to claim 4, characterized in that
the radiation source (12) is a white light-emitting LED.

7. Arrangement according to claim 4, characterized in that
the radiation source is a white light-emitting laser.

8. Arrangement according to claim 4, characterized in that
the radiation source (12) consists of at least a red, a green and a blue-emitting LED the emitted radiation of which is concentrated into a ray of white light.

9. Arrangement according to claim 4, characterized in that
the radiation source (12) is at least a red light, green light and blue-emitting laser, the emitted irradiation of which is concentrated into a ray of white light.

10. Arrangement according to claim 4, characterized in that
the color-recognizing sensor (20) has a red, a blue and a green-sensitive surface.

11. Arrangement according to claim 4, characterized in that
the efflux area of the light-guiding element (18) is equal to the radiation-sensitive overall area of the color-recognizing sensor (20).

12. Arrangement according to claim 4, characterized in that
the object side influx side (22) of the light-guiding element has an extension that corresponds to at least 25 times the radiation-sensitive overall area of the color-recognizing sensor (20).

13. Arrangement according to claim 4, characterized in that the color-recognizing sensor (20), reached by the radiation reflected by the object (10) and the radiation penetrating the light-guiding element (18), perceives a radiation energy that corresponds to the radiation received directly from the object from the one color-recognizing sensor corresponding to $(2 \times n+1)^2-1$ virtual color-recognizing sensors (24) plus the one real color-recognizing sensor (20), whereby n is the maximum number of reflections of radiation in the light-guiding element.

14. Arrangement according to claim 4, characterized in that the radiation reflected by the object (10) into the light guiding element (18) penetrates an apparent aperture diaphragm, which is specified by the aperture fixed between the site of reflection on the object and the overall peripheral edge of the virtual color-recognizing sensor (24).

15. Arrangement according to claim 4, characterized in that the object (10) is arranged in a receiving space usable for incident radiation which is bounded by an envelope which is fixed by the overall peripheral edge of the virtual color-recognizing sensors (24) as well as the peripheral edge of the influx area (22) of the light-guiding element (18).

16. Arrangement according to claim 4, characterized in that intermediate space available between the sensor side surface of the light-guiding element (18), and the color-recognizing sensor (24) is filled with a material that has a refractive index, which corresponds to that of the light-guiding element.

* * * * *